US008515666B2

(12) United States Patent  
Tysowski

(10) Patent No.: US 8,515,666 B2  
(45) Date of Patent: Aug. 20, 2013

(54) METHOD FOR DISPLAYING MAP LABELS FOR GEOGRAPHICAL FEATURES HAVING ALTERNATE NAMES

(75) Inventor: Piotr Konrad Tysowski, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 427 days.

(21) Appl. No.: 12/393,468

(22) Filed: Feb. 26, 2009

(65) Prior Publication Data

US 2010/0217521 A1  Aug. 26, 2010

(51) Int. Cl.
*G08G 1/123* (2006.01)
*G08B 1/08* (2006.01)
*G01C 21/36* (2006.01)
*G01C 21/34* (2006.01)
*G08G 1/0969* (2006.01)

(52) U.S. Cl.
CPC .......... *G01C 21/3492* (2013.01); *G08G 1/0969* (2013.01)
USPC .................... 701/423; 340/995.1; 340/539.11

(58) Field of Classification Search
USPC ......... 701/200, 208, 211; 340/995.1, 539.11, 340/539.13, 995.14, 995.24
See application file for complete search history.

(56) References Cited

U.S. PATENT DOCUMENTS

| 6,081,803 A * | 6/2000 | Ashby et al. ........................ 1/1 |
| 6,188,955 B1 * | 2/2001 | Robinson et al. ............. 701/430 |
| 6,336,111 B1 * | 1/2002 | Ashby et al. ................... 707/715 |
| 2006/0100776 A1 * | 5/2006 | Weiss et al. .................... 701/200 |
| 2007/0276585 A1 * | 11/2007 | Hisada et al. ................. 701/200 |
| 2008/0091657 A1 * | 4/2008 | Yamazaki ......................... 707/3 |
| 2008/0158018 A1 * | 7/2008 | Lau ........................... 340/995.24 |

OTHER PUBLICATIONS

European Search Report for EP Application No. 09153824.9, mailed Jul. 9, 2009.

* cited by examiner

*Primary Examiner* — Patrick Cicchino
(74) *Attorney, Agent, or Firm* — Gowling Lafleur Henderson LLP

(57) ABSTRACT

A method of displaying a map on a portable electronic device entails requesting map data that includes label data for at least one map label for a map feature known alternatively by a first name and a second name. The method further involves determining, based on a predetermined criterion, which of the first name and the second name is to be displayed on the portable electronic device. The predetermined criterion may be, for example, the current location of the device, a carrier identifier, or a personal identifier containing geographically relevant information from which a preferred map label may be inferred.

15 Claims, 7 Drawing Sheets

METHOD FOR DISPLAYING MAP LABELS FOR GEOGRAPHICAL FEATURES HAVING ALTERNATE NAMES

CROSS-REFERENCE TO RELATED APPLICATIONS

This is the first application filed for the present technology.

TECHNICAL FIELD

The present technology relates to portable electronic devices capable of displaying maps and, in particular, to wireless communications devices with mapping capabilities.

BACKGROUND

Portable electronic devices such as GPS-enabled wireless communications devices or GPS navigation units are increasingly popular. These devices are able to not only display labelled maps but also track and display the current location of the device, thereby enabling navigation and other location-based services. Map data for a given area of the world, e.g. North America, may be preloaded (stored) in a memory of the device, as is typically the case with GPS navigation units or, alternatively, this map data may be downloaded over the air, as needed, from a map server, as is typically the case with wireless communications devices.

In rendering a map with suitable map labels, a problem arises when a geographical feature (e.g. a region, city, body of water, etc.) has more than one possible place name. In certain contexts, or for certain users, one place name may be preferred over the other. For example, some geographical features are disputed, i.e. an international dispute exists over the place name. For example, the Sea of Japan is known as the East Sea to Koreans. For device manufacturers or for map database developers, this can pose a significant problem since the choice of one place name in lieu of the other may be culturally unacceptable or even offensive in a given country or to a given group of people. For example, a South Korean telecommunications carrier would be loath to market a wireless communications device that generates maps with the label "Sea of Japan" as this would be culturally offensive to its Korean customers. Similarly, a Japanese telecommunications carrier would be loath to market a wireless communications device that generates maps with the label "East Sea" as this would be culturally offensive to its Japanese customers. Using a single map database to service end-users in both nations is thus problematic. In addition to this specific example, there are numerous instances around the world of geographical place name disputes. A method of displaying maps that takes these naming disputes into account would thus be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, the present technology provides an innovative technique for enabling a portable electronic device such as, for example, a GPS navigation unit or a wireless communications device, to label a map that contains a map feature for which more than one place name exists. In broad terms, the technology entails determining which of one of the alternate place names is to be used on the map. This determination can be based on one or more predetermined criteria such as, for example, a current location of the device, a carrier identifier, and/or a personal identifier that contains geographically relevant information from which the most appropriate place name can be inferred. This technology therefore provides adaptive labelling based on one or more of a variety of factors that influence whether one place name is more acceptable to the device user than another.

Thus, a main aspect of the present technology is a method of displaying a map on a portable electronic device. The method entails requesting map data that includes label data for at least one map label for a map feature known alternatively by a first name and a second name, and determining, based on a predetermined criterion, which of the first name and the second name is to be displayed on the portable electronic device. The predetermined criterion may be, for example, the current location of the device, a carrier identifier, or a personal identifier containing geographically relevant information from which a preferred map label may be inferred.

Another main aspect of the present technology is a computer readable medium comprising code which when loaded into memory and executed on a processor of a portable electronic device is adapted to request map data that includes at least one map label for a map feature known alternatively by a first name and a second name, and determine, based on a predetermined criterion, which of the first name and the second name is to be displayed on the portable electronic device.

Yet another main aspect of the present technology is a portable electronic device comprising a memory for storing map data that includes label data for at least one label for a map feature known alternatively by a first name and a second name, a processor operatively coupled to the memory for determining, based on a predetermined criterion, which of the first name and the second name is to be displayed on the portable electronic device, and a display for displaying a map containing the map label. The portable electronic device may be, for example, a GPS navigation unit with map data already stored in the device or a wireless communications device capable of downloading map data from a map server.

The details and particulars of these aspects of the technology will now be described below, by way of example, with reference to the attached drawings.

Figure 1:
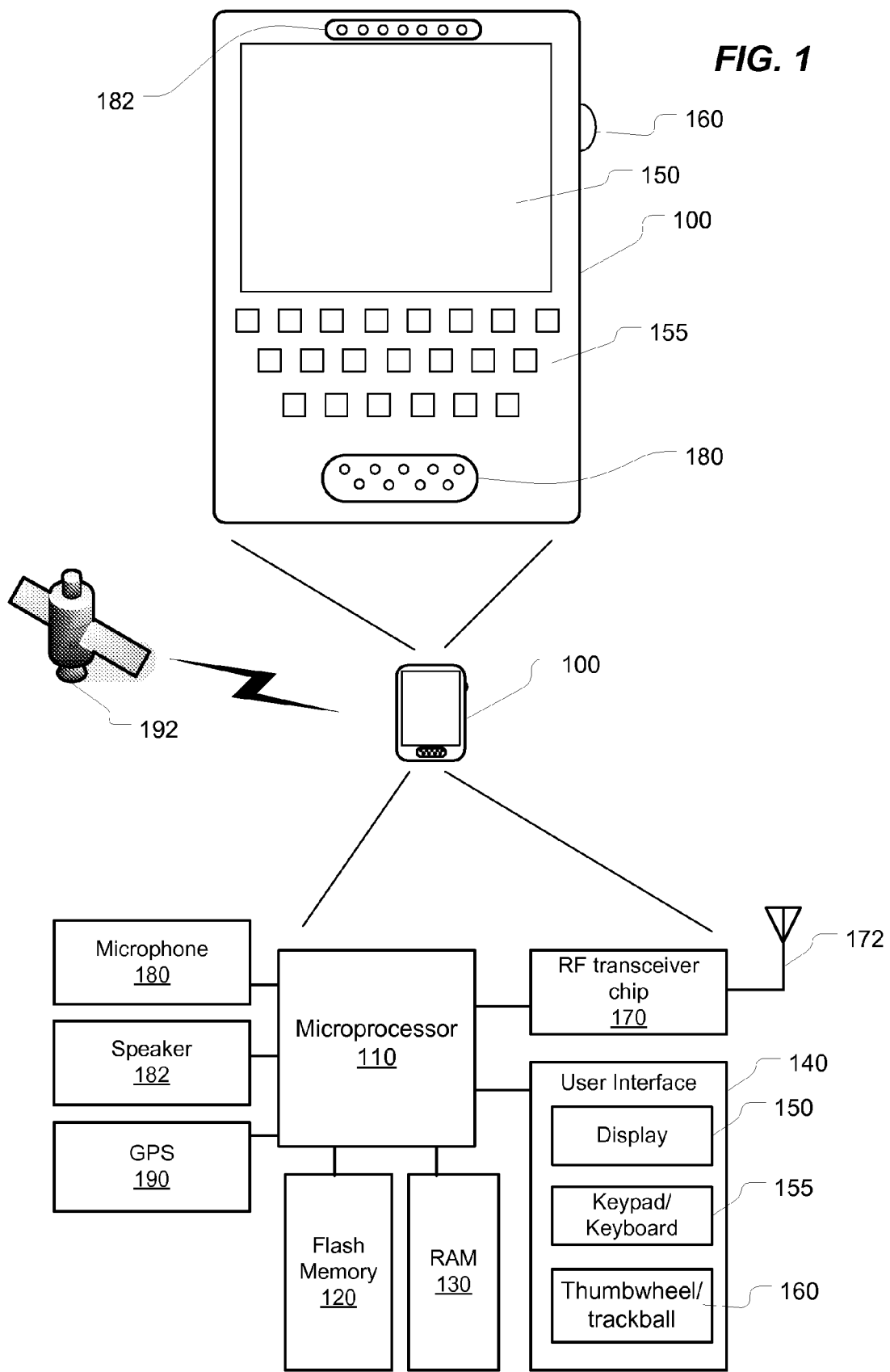
FIG. 1 is a schematic depiction of a wireless communications device as an example of a portable electronic device in which the present technology can be implemented.

FIG. 1 is a schematic depiction of a wireless communications device 100 as one example of a portable electronic device on which the present technology can be implemented. The term "wireless communications device" is meant to encompass a broad range of cellular and mobile devices such as, for example, smartphones, cell phones, satellite phones, wireless-enabled personal digital assistants (PDAs), wireless-enabled computing tablets, wireless-enabled laptops, etc.

As shown schematically in FIG. 1, the wireless communications device 100 includes a microprocessor (referred to herein as a "processor") 110 operatively coupled to memory (Flash Memory 120 and/or RAM 130). The device 100 has a user interface 140 which includes a display (e.g. an LCD screen) 150, a keyboard/keypad 155. A thumbwheel/trackball 160 may optionally be provided as part of the user interface. Alternatively, the user interface 140 may include a touch screen in lieu of a keyboard/keypad. The wireless communications device 100 includes a radiofrequency (RF) transceiver chipset 170 for wirelessly transmitting and receiving data and voice communications, e.g. via a cellular network. The wireless communications may be performed using CDMA, GSM, or any other suitable communications standard or protocol. A microphone 180 and speaker 182 are provided for voice communications.

As further depicted in FIG. 1, the wireless communications device 100 includes a GPS chipset 190 (or other position-determining subsystem) to determine the current location of the device from radiofrequency signals emitted by a plurality of orbiting GPS satellites.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of position-determining subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Radiolocation techniques may also be used in conjunction with GPS in a hybrid positioning system.

References herein to "GPS" are meant to include Assisted GPS and Aided GPS.

Other location-determining subsystems may also be used to provide more granular location data. In some embodiments, it may be sufficient to determine in what country the device is operating. In other embodiments, greater precision may be necessary. These other location-determining subsystem may involve, for example, techniques based on the identity of the closest base station tower or techniques involving obtaining information stored in a home location register (HLR) or visitor location register (VLR).

Figure 2:
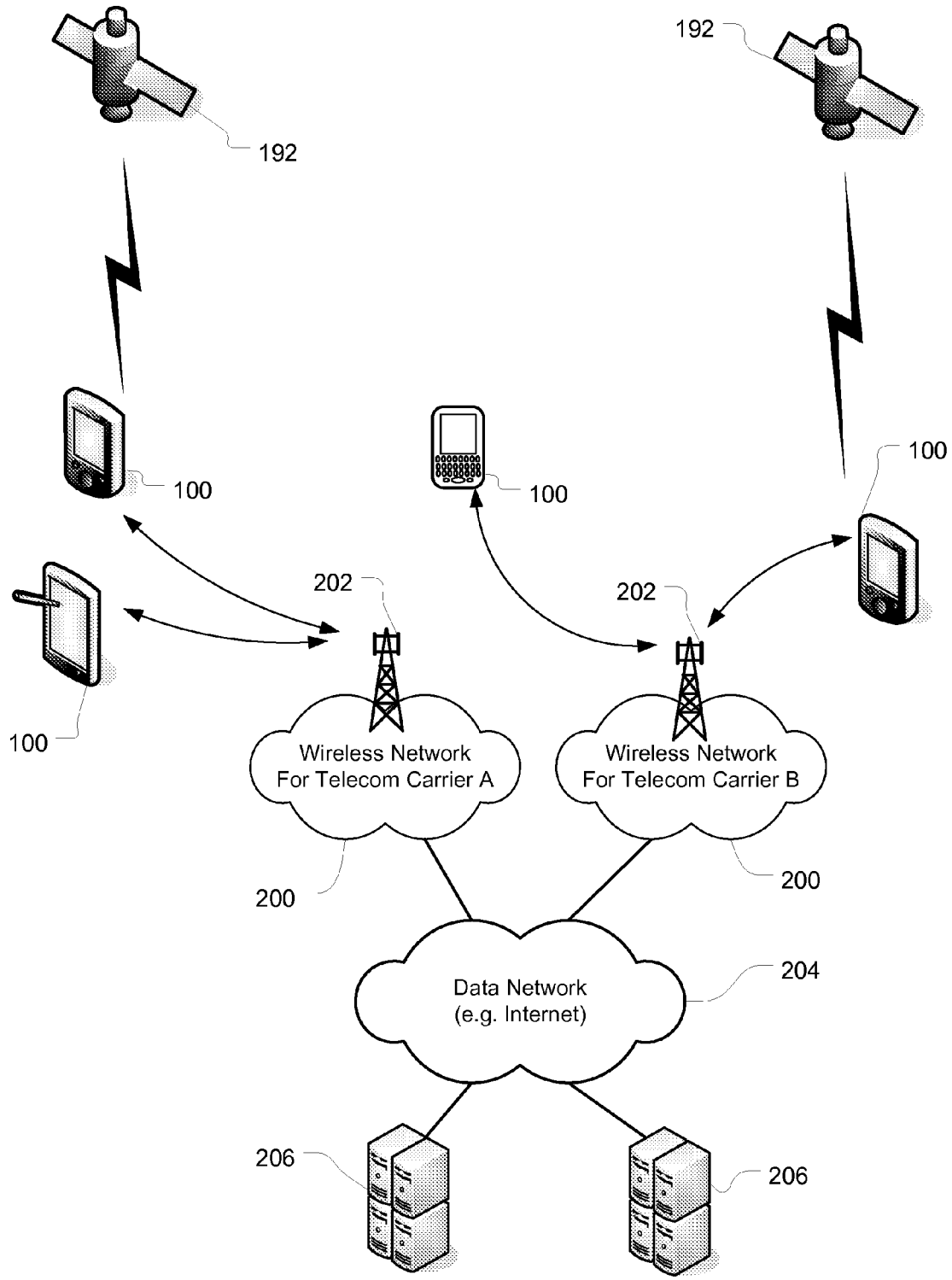
FIG. 2 is a schematic depiction of a plurality of wireless communications devices connected to map servers via wireless networks and the Internet.

FIG. 2 schematically depicts how a plurality of wireless communications devices 100 connect to one or more map servers 206 via respective wireless networks 200 and the Internet 204. In specific implementations that are discussed below in greater detail, the devices 100 can communicate requests for map data to one or more map servers 206. Accompanying the request (or, alternatively, transmitted separately) may be some indication of the context in which the device is operating, where the device is located or which network is attached to, or associated with, the device. This may take the form of a carrier identifier or some location data that is sent to the map server 206 to enable the map server to decide which place name is most suitable for the map label. In these scenarios, the map server decides which place name to provide for the map label based on one of these predetermined criteria. Alternatively, the device can make this decision (in which case the map server returns a plurality of alternate place names as suggestions for the map label).

Figure 3:
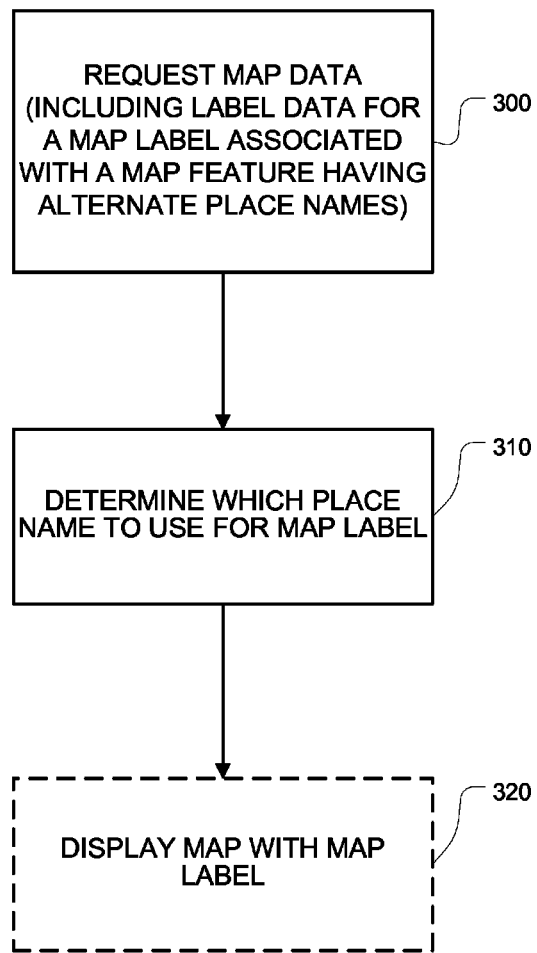
FIG. 3 is a flowchart outlining some of the main steps of a method of displaying a map on a portable electronic device that involves deciding which of two alternate place names is to be used as the map label for the disputed place name.

FIG. 3 is a flowchart outlining some of the main steps of a novel method of displaying a map on a portable electronic device where the map contains a map label for a place whose name is in dispute (or with which more than one place name may be associated). The method comprises (at step 300) requesting map data that includes label data for at least one map label for a map feature known alternatively by a first name and a second name. The method further comprises (at step 310) determining, based on a predetermined criterion, which of the first name and the second name is to be displayed on the portable electronic device. The method may further involve displaying the map with the selected map label (at step 320).

In one implementation of this novel method, the predetermined criterion is a current location of the portable electronic device. The current location may be determined using GPS, or any other suitable position-determining subsystem or location-determining technique. For example, if the current location corresponds to a certain region or country that is known to prefer one place name over another, the device can be configured to render the map using the preferred place name. Alternatively, a map server receiving a request for map data may also receive the current location of the device, correlate that to a particular region, and then decide which place name to return as the map label for the disputed place based on the country in which the device is currently located.

In another implementation, where the portable electronic device is a wireless communications device, the predetermined criterion may be a carrier identifier, i.e. a unique code that identifies or is otherwise associated with a specific telecommunications carrier or network. If the device is registered with a South Korean telecommunications provider, then the label "East Sea" should be used. If the device is roaming, then depending on the device's configuration or the user's preference, either the identity of the local network or of the home network can be used as the criterion for determining which place name to use as the map label. For example, if the map server receives a map request along with the carrier identifier, the map server can determine which place name to return as the map label based on the carrier identifier. In one main implementation, the device provides the map server with its carrier identifier every time map data is requested.

Figure 5:
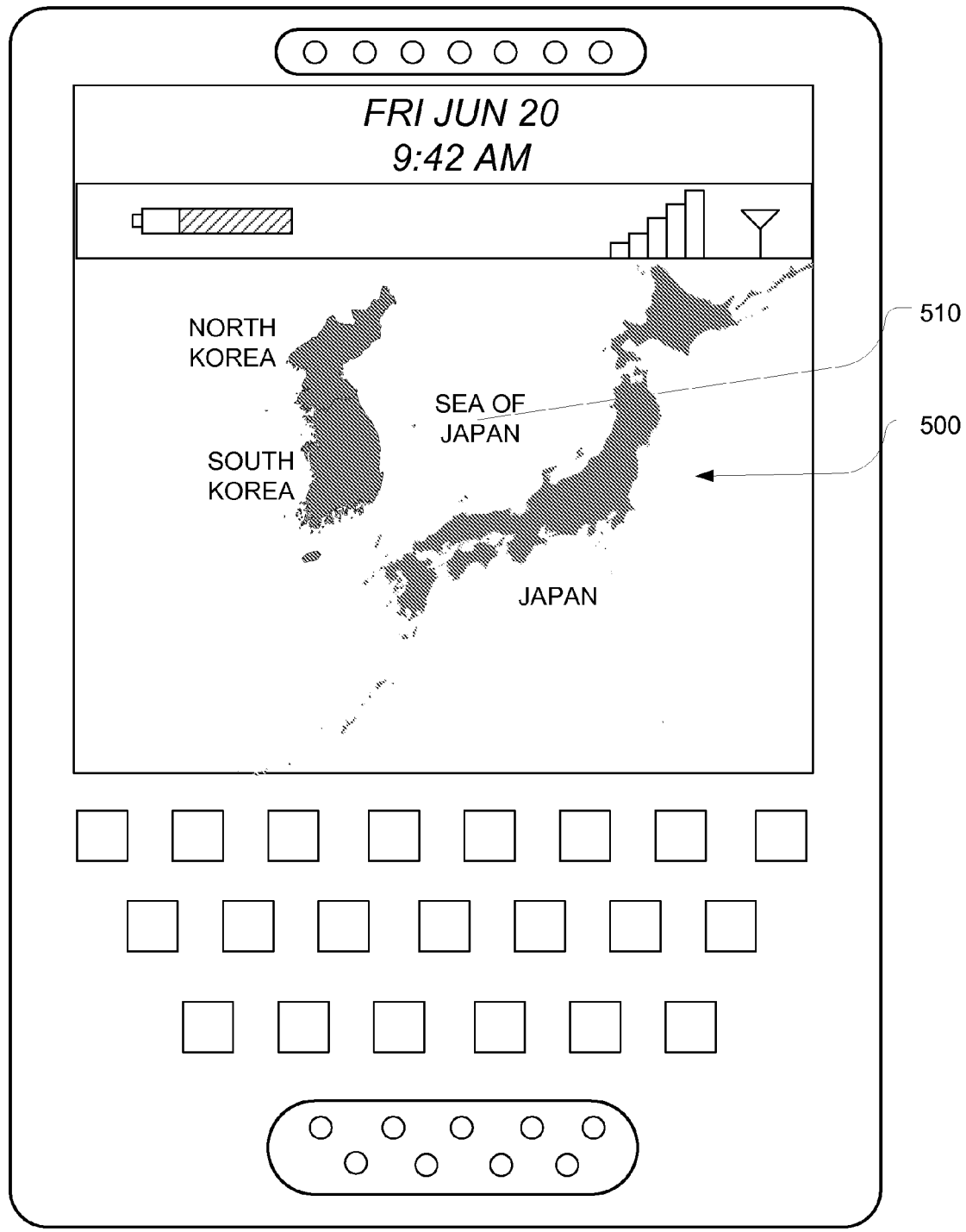
FIG. 5 depicts an example of a map rendered on a wireless communications device with a first name "Sea of Japan" used as a map label for the disputed geographical feature.
Figure 6:
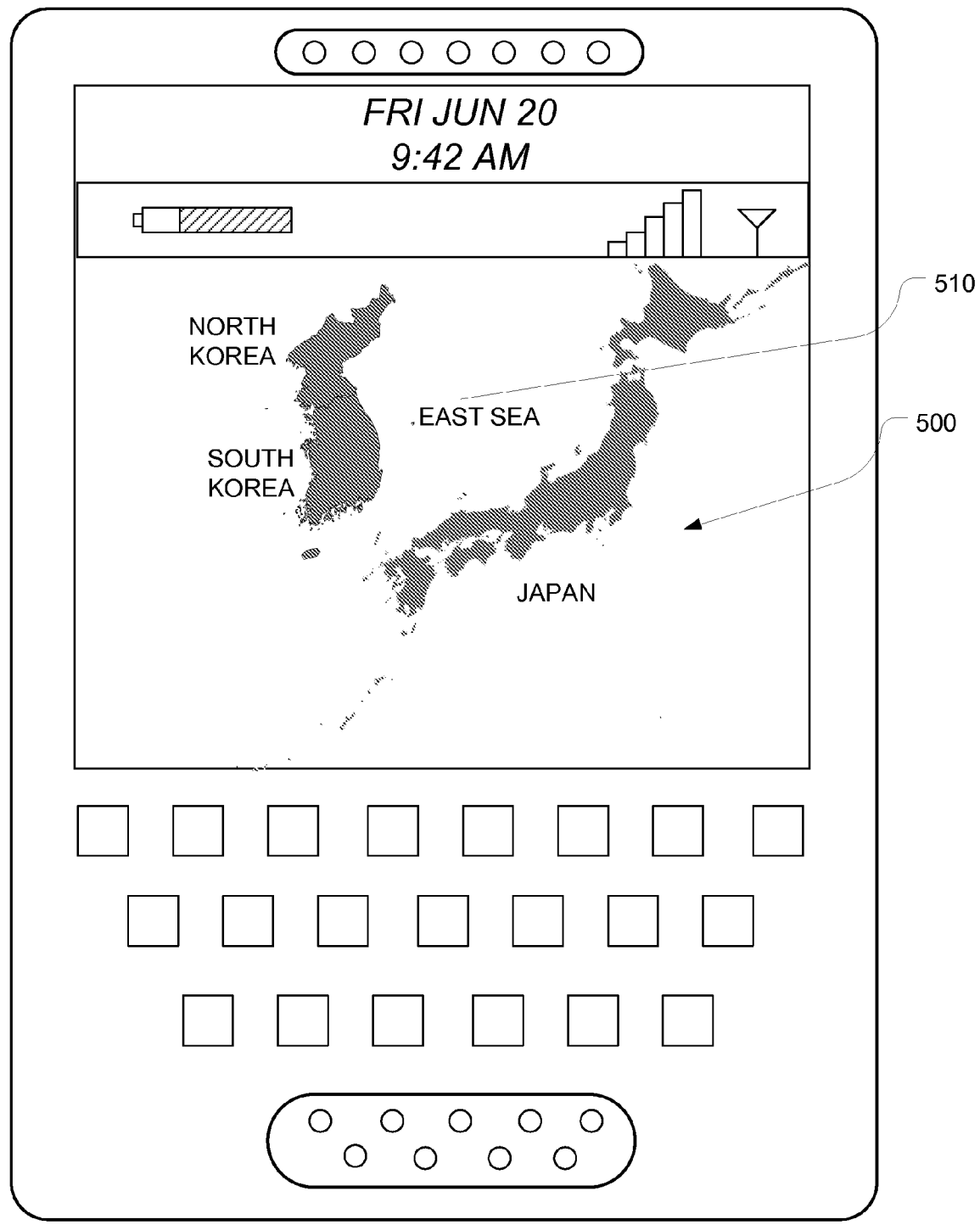
FIG. 6 depicts an example of a map rendered on a wireless communications device with a second name "East Sea" used as the map label for the disputed geographical feature.

In another implementation of this novel method, where the portable electronic device is again a wireless communications device, the predetermined criterion may be a personal identifier (e.g. device owner's name, residential address, home phone number). A preferred map label can be inferred from the personal identifier where this identifier contains geographically related information. For example, if the owner's name is Japanese, then the map 500 is rendered with the label Sea of Japan as depicted by way of example in FIG. 5. Likewise, if the owner's residential address is Seoul, South Korea, then the label "East Sea" would be used on the map as shown by way of example in FIG. 6. If the phone number associated with the mobile device has an area associated with Tokyo, for example, then the label "Sea of Japan" would be used.

A manual setting, preference or override may be provided to enable the user of the device to specify a user preference (i.e. a national/cultural affiliation) that can then be used as the predetermined criterion for determining (either at the server or at the device) which place name to use as a map label. For example, the device user may select "Japanese map labels" or "Korean map labels" in an options menu or preferences page to thereby configure the device to only render map labels using place names that are culturally acceptable to the national affiliation selected by the user. Alternatively, this map labelling preference may be inferred from the language setting of the device. Thus, if the language setting of the device is set to Japanese, for example, then the device may be configured to automatically infer that place names that are culturally acceptable to the Japanese people should be utilized (e.g. "Sea of Japan"). If the device's language setting is then switched to, for example, Korean, then the device would, in this particular implementation, know to use the place name "East Sea" instead of "Sea of Japan".

Figure 4:
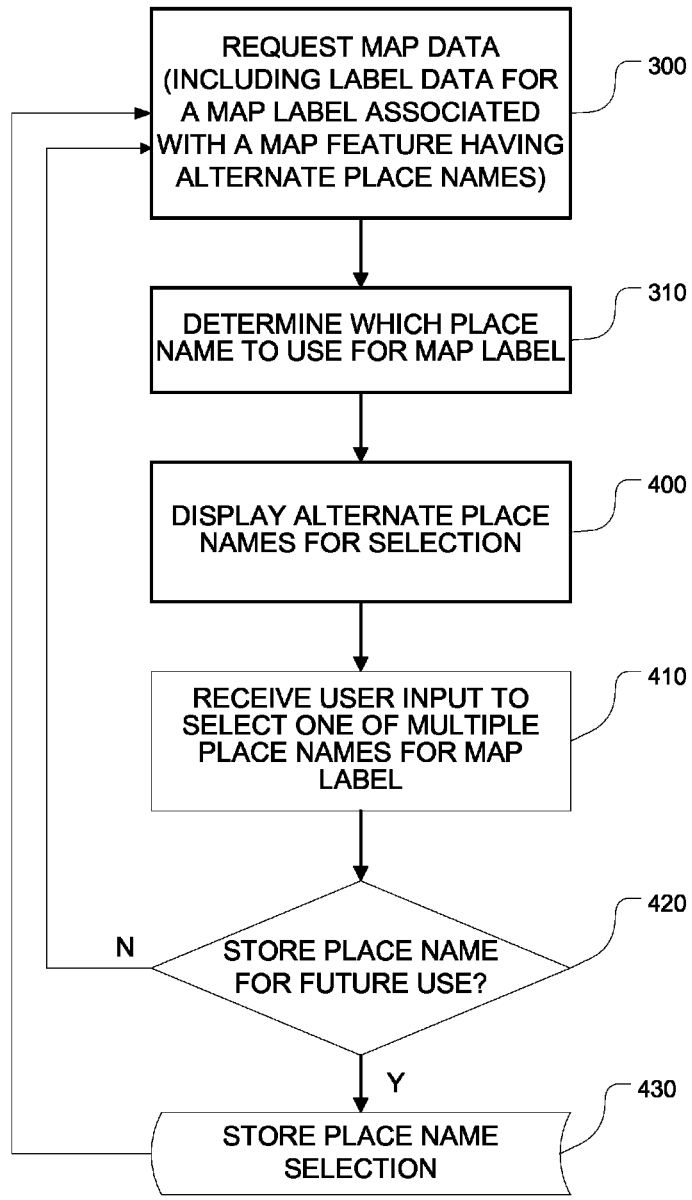
FIG. 4 depicts another flowchart of a related method in accordance with one implementation of the technology.

In yet another implementation, which is depicted in FIG. 4, this novel method further entails (at step 400) displaying on the map 500 both the first name and the second name as alternative choices 512 for the map label (as shown by way of example in FIG. 7) and then receiving (at step 410) user input via a user input device (e.g. keypad/keyboard, touch-screen, etc.) enabling selection of either the first name or the second name as a chosen map label. Where more than one choice is presented onscreen, the choices may optionally be prioritized based on any of the criteria mentioned in this disclosure. If the choices are prioritized, one of the two choices can be highlighted (or conversely one of the two may be greyed out) as a way to suggest or recommend to the user the map label that is more likely to represent the preferred place name (given the user's preferences, location, telecom carrier, etc.).

Optionally, at step 420, the method may further involve deciding whether to store the chosen map label (i.e. the place name selected by the user as being the label preferred by the user). The chosen map label can be stored (at step 430) either locally on the device or at a server, and can be recalled (as the user's preference) at a future time if another map with the same disputed map feature is to be rendered again.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

Another aspect of the present technology is a portable electronic device such as, for example, a GPS navigation unit or a wireless communications device 100 (such as shown schematically in FIG. 1) that displays maps and resolves which one of a plurality of place names associated with a map feature is to be used as the map label. The device includes a memory 120, 130 for storing map data that includes label data for at least one label for a map feature known alternatively by a first name and a second name. The device also includes a processor 110 operatively coupled to the memory 120, 130 for determining, based on a predetermined criterion, which of the first name and the second name is to be displayed on the portable electronic device. The device further includes a display 150 for displaying a map containing the map label.

By way of overview, it should be understood that the map data may be stored permanently in a non-volatile memory such as, for example, ROM, PROM, EPROM, Flash memory (as is typically the case with a GPS navigation unit where a long-term persistent storage is used to store all the map data for a given region such as, for example, North America or Europe.) Alternatively, a volatile memory such as, for example, RAM (e.g. DRAM, SRAM) may be used to cache the map data on the device after it is received from an outside source such as a map server, as is the case typically with mapping-enabled wireless communications devices. In either case, whether it is downloaded from a map server and cached or already preloaded permanently on the device, the map data is stored on the device to enable the device to render this data as a map onscreen. For the purposes of this specification, therefore, requesting map data may involve, for example, transmitting a request for map data from the device to a map server, or requesting map data (e.g. internally via a data bus) from the memory of the device. As will be elaborated below, the predetermined criterion can be current location (e.g. determined by GPS, by closest base station, etc.), carrier identifier (or network identifier), personal identifier (e.g., ethnicity of a name, home address, work address, area code of the mobile telephone number associated with the device, etc.) language setting on the device, user preference as regards map labeling (if such a setting is available) or any other indicator or factor that influences a preference for one place name over another.

In one implementation, the device is a wireless communications device 100 comprising a radiofrequency transceiver 170 having a transmitter for sending a request for map data and a receiver for receiving the map data. As shown in FIG. 2, requests for map data are sent from the devices 100 through respective wireless networks 200 (via base station towers 202). The requests are forwarded through the wireless network 200 and then through the Internet 204 to one or more map servers 206. In one implementation, the map servers 206 determine which one of the place names to use as the map label based on a predetermined criterion communicated to the map server (e.g. carrier identifier, current location, user preference, language setting, etc.). Having decided which place name to use as the map label, the map server then returns the map label (as part of the map data for an area of interest) to the device for rendering onscreen. Alternatively, the map server can return all known alternate place names for the disputed map label and let the device make the decision locally as to which place name is most appropriate based on the predetermined criterion. In another variant, the map server may suggest (or prioritize) the alternate place names for the map label to thereby enable the device to make a final decision (locally) as to which place name to use. This would enable the device user to configure his device to override selections made by the server. For example, if the user is traveling in a foreign country, he may wish to have his map show the place name by which it is habitually known in the foreign country (e.g. in case he wishes to show his map to a local of the foreign country).

For a wireless communications device, as noted above, it is typically the case that the map data is requested and downloaded over the air from a map server (via a wireless network and a data network as shown in FIG. 2). In a variant, some or all of the map data may be preloaded (already stored) in a non-volatile memory of the device. For example, in one variant, the device may be preloaded with all the preferred labels for every disputed place name on the globe. These can then be called up immediately when a map is rendered for a region containing one of these place names. In other cases, it should be noted that some or all of the map label data needed may be downloaded and cached in a volatile memory of the device when the maps are first generated. The device can then reuse the map labels without having to perform a fresh analysis of which place name to use.

In one implementation, the device further comprises a location-determining subsystem (e.g. GPS) for determining a current location of the device. In this implementation, the processor may be configured to use this current location of the device as the predetermined criterion for determining whether to display the first name or the second name as the map label.

Figure 7:
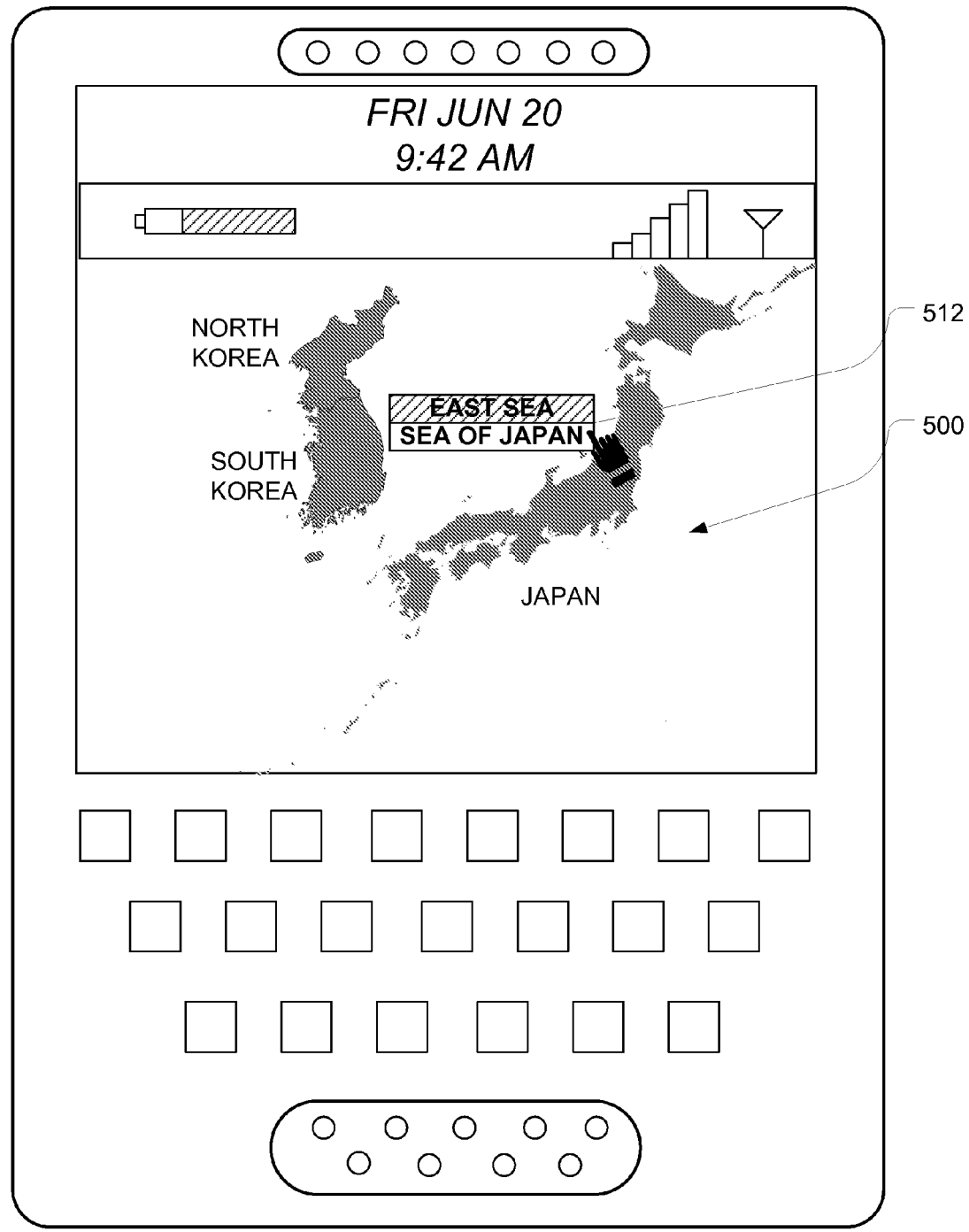
FIG. 7 depicts an example of a map rendered on a wireless communications device with both the first and second alternate place names rendered onscreen to enable selection of a preferred label from the two alternate place names.

In one implementation, the predetermined criterion is a carrier identifier (or network identifier). Alternatively, the predetermined criterion can be a personal identifier containing geographically related information from which a preferred map label can be inferred (e.g. home address, work address, area code of the mobile number associated with the device). Optionally, as depicted in FIG. 7, the display may present both the first name and the second name as alternative choices for the map label. The user input device (user interface 140) may be used to input a selection of either the first name or the second name as a chosen map label. The user input device may also be used for editing a map label displayed onscreen or for entering a new name for the map label where the user of the device, for example, wishes to customize a label, change a spelling of the label showing onscreen, or enter an annotation.

The decision whether to use the first name or the second name as the map label can also be based on a plurality of predetermined criteria (instead of only one criterion) including at least two of a current location of the device, a carrier identifier, a user preference (user setting), language setting, and a personal identifier containing geographically relevant information from which a preferred map label can be inferred. In other words, the choice of place name can be based on a single criterion or on multiple criteria. The criteria themselves may be selected or deselected by the user or a system administrator.

From the foregoing disclosure, it should now be apparent that this novel technology can be used to resolve problems associated with the labelling of one or more geographical features whose place names are in dispute. However, it should also be noted that this technology can be used not only for disputed geographical place names but also for names that have been changed over time due to different transliterations (Peking to Beijing), political upheavals (Leningrad to Saint Petersburg). In these cases, some device users might prefer (for nostalgic, cultural, political or other personal reasons) to have their maps labelled with the older spelling of the place name. This novel technology can also be used to handle map-labelling situations where a local name is used to replace a colonial name (e.g. Bombay becoming Mumbai), or where a place name may have a special historical alternate name (Constantinople for Istanbul), or places with short-forms (L.A. instead of Los Angeles). Even though these place names are not in dispute, this new technology can be used to resolve which of multiple (alternative) place names is to be used for a map label. In other words, this technology provides adaptive labelling for map labels for which there are multiple alternate names. This adaptive labelling technique enables contextual selection of the most appropriate map label for a feature having more than one name from a single map database based on one or more predetermined criteria. This is said to be "adaptive labelling" because the map labelling adapts to the specific preferences of the device user and/or the current location of the device and/or the telecommunications carrier (or specific network) with which the device is registered and/or any other context in which the device is operating from which a place name preference may be inferred.

In the foregoing disclosure, it should be noted that the adaptive labelling operates within the context of one particular language-specific implementation of the device. In other words, the labelling conflict resolution technique described herein presupposes that a specific language for the device has been selected and that the place name conflict arises within that language.

This new technology has been described in terms of specific implementations and configurations which are intended to be exemplary only. The scope of the exclusive right sought by the Applicant is therefore intended to be limited solely by the appended claims.

The invention claimed is:

1. A method of displaying a map on a portable electronic device, the method comprising:
   obtaining a current location of the portable electronic device;
   requesting, based on the current location, map data that includes label data for at least one map label for a map feature known alternatively by at least a first name and a second name within a selected language; and
   determining, based on the current location, which of the first name and the second name is to be displayed on the portable electronic device.

2. The method as claimed in claim 1 wherein determining which of the first name and the second name is to be displayed is further based on at least one predetermined criterion comprising a carrier identifier and a personal identifier containing geographically related information from which a preferred map label can be inferred.

3. The method as claimed in claim 1 wherein the portable electronic device is a wireless communications device and wherein determining which of the first name and the second name is to be displayed is further based on a carrier identifier.

4. The method as claimed in claim 1 wherein the portable electronic device is a wireless communications device and wherein determining which of the first name and the second name is to be displayed is further based on a personal identifier containing geographically related information from which a preferred map label can be inferred.

5. The method as claimed in claim 1 further comprising:
   displaying both the first name and the second name as alternative choices for the map label; and
   receiving input via a user input device enabling selection of either the first name or the second name as a chosen map label.

6. The method as claimed in claim 5 further comprising storing the chosen map label.

7. A computer readable medium comprising code which when loaded into memory and executed on a processor of a portable electronic device is adapted to perform acts of:

obtaining a current location of the portable electronic device;

requesting, based on the current location, map data that includes at least one map label for a map feature known alternatively by a first name and a second name within a selected language; and determining, based on the current location, which of the first name and the second name is to be displayed on the portable electronic device.

8. A portable electronic device comprising:

a location-determining subsystem for obtaining a current location of the portable electronic device;

a memory for storing map data that includes label data for at least one label for a map feature known alternatively by a first name and a second name within a selected language; and a processor operatively coupled to the memory for determining, based on the current location, which of the first name and the second name is to be displayed on the portable electronic device; and a display for displaying a map containing the map label.

9. The device as claimed in claim 8 further comprising a radiofrequency transceiver having a transmitter for sending a request for map data and a receiver for receiving the map data.

10. The device as claimed in claim 8, wherein determining which of the first name and the second name is to be displayed is further based on at least one predetermined criterion comprising a carrier identifier and a personal identifier containing geographically related information from which a preferred map label can be inferred.

11. The device as claimed in claim 8 wherein determining which of the first name and the second name is to be displayed is further based on a carrier identifier.

12. The device as claimed in claim 8 wherein determining which of the first name and the second name is to be displayed is further based on a personal identifier containing geographically related information from which a preferred map label can be inferred.

13. The device as claimed in claim 8 wherein the display presents both the first name and the second name as alternative choices for the map label and wherein the device further comprises a user input device for receiving input for selecting of either the first name or the second name as a chosen map label.

14. The device as claimed in claim 8 further comprising a user input device for editing a map label displayed onscreen or for entering a new name for the map label.

15. The device as claimed in claim 8 wherein the processor determines whether to use the first name or the second name as the map label based on a plurality of predetermined criteria including at least a carrier identifier, and a personal identifier containing geographically relevant information from which a preferred map label can be inferred.

\* \* \* \* \*